United States Patent
Ho et al.

(10) Patent No.: US 10,278,036 B1
(45) Date of Patent: Apr. 30, 2019

(54) TELEPHONE WITH CARD-READER

(71) Applicant: TP Lab, Inc., Palo Alto, CA (US)

(72) Inventors: Chi Fai Ho, Palo Alto, CA (US); Shin Cheung Simon Chiu, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 261 days.

(21) Appl. No.: 14/821,737

(22) Filed: Aug. 8, 2015

Related U.S. Application Data

(63) Continuation of application No. 11/473,752, filed on Jun. 23, 2006, now Pat. No. 9,137,388.

(51) Int. Cl.
| | |
|---|---|
| *H04W 4/16* | (2009.01) |
| *G06Q 20/34* | (2012.01) |
| *H04M 1/247* | (2006.01) |
| *H04W 8/18* | (2009.01) |
| *H04W 4/06* | (2009.01) |
| *H04M 17/00* | (2006.01) |
| *G07F 7/08* | (2006.01) |
| *G07F 7/10* | (2006.01) |
| *H04M 17/02* | (2006.01) |

(52) U.S. Cl.
CPC ............ *H04W 4/16* (2013.01); *G06Q 20/341* (2013.01); *G07F 7/0886* (2013.01); *G07F 7/1008* (2013.01); *H04M 1/247* (2013.01); *H04M 17/00* (2013.01); *H04M 17/026* (2013.01); *H04W 4/06* (2013.01); *H04W 8/183* (2013.01); *H04M 2250/14* (2013.01)

(58) Field of Classification Search
CPC ......... H04W 4/16; H04W 4/06; H04W 8/183; H04M 17/026; H04M 17/00; H04M 1/247; H04M 2250/14; G07F 7/1008; G07F 7/0886; G06Q 20/341
See application file for complete search history.

(56) References Cited

U.S. PATENT DOCUMENTS

| | | | | |
|---|---|---|---|---|
| 7,634,263 | B2* | 12/2009 | Louch | H04M 11/007 345/169 |
| 8,165,086 | B2* | 4/2012 | Gallagher | H04W 76/022 370/328 |
| 8,413,209 | B2* | 4/2013 | Aldera | H04L 63/102 713/185 |
| 2002/0016180 | A1* | 2/2002 | Derosier | H04W 48/04 455/522 |

(Continued)

*Primary Examiner* — Mounir Moutaouakil
(74) *Attorney, Agent, or Firm* — North Shore Patents, P.C.; Michele Liu Baillie

(57) ABSTRACT

A telephone with a card reader is disclosed. The telephone includes means for providing a first communication service. The card includes a memory, which stores information, where the telephone reads the information stored in the memory and provides a means for providing a second communication service based on the information. In providing the second communication service, the telephone obtains second communication service information from a datastore, which includes pairs of information and corresponding second communication service information. The telephone may include the datastore. The telephone may alternatively obtain the second communication service information from or a service server in response to a request. Alternatively, the information stored in the memory can be the second communication service information itself.

24 Claims, 6 Drawing Sheets

(56) References Cited

U.S. PATENT DOCUMENTS

| | | | | |
|---|---|---|---|---|
| 2004/0233930 A1* | 11/2004 | Colby, Jr. | G06F 1/1632 | 370/464 |
| 2005/0190700 A1* | 9/2005 | Melpignano | H04W 74/06 | 370/244 |
| 2005/0203854 A1* | 9/2005 | Das | G06Q 20/32 | 705/64 |
| 2005/0271186 A1* | 12/2005 | Lichorowic | H04M 3/53333 | 379/37 |
| 2005/0286466 A1* | 12/2005 | Tagg | H04L 12/2856 | 370/329 |
| 2006/0010272 A1* | 1/2006 | Solomon | G06F 15/7867 | 710/105 |
| 2006/0089124 A1* | 4/2006 | Frank | H04L 63/0853 | 455/411 |
| 2006/0107037 A1* | 5/2006 | Lincoln | G06F 21/12 | 713/155 |
| 2006/0268838 A1* | 11/2006 | Larsson | H04L 63/0807 | 370/352 |
| 2007/0015535 A1* | 1/2007 | LaBauve | H04L 29/06027 | 455/552.1 |
| 2007/0015536 A1* | 1/2007 | LaBauve | H04L 29/06027 | 455/552.1 |
| 2007/0140199 A1* | 6/2007 | Zhao | H04W 52/0229 | 370/338 |
| 2008/0215711 A1* | 9/2008 | Shitrit | G06F 17/30899 | 709/220 |
| 2008/0282334 A1* | 11/2008 | Yves | G06Q 20/341 | 726/9 |
| 2009/0129371 A1* | 5/2009 | Bishay | H04W 84/042 | 370/352 |
| 2009/0247194 A1* | 10/2009 | Tarrago | H04L 51/14 | 455/466 |
| 2010/0208634 A1* | 8/2010 | Eng | H04L 45/00 | 370/310 |
| 2010/0323730 A1* | 12/2010 | Karmarkar | H04L 51/38 | 455/466 |
| 2014/0289533 A1* | 9/2014 | Shah | G06F 21/725 | 713/178 |
| 2017/0344105 A1* | 11/2017 | Mullen | G06F 1/1669 | |

* cited by examiner

US 10,278,036 B1

TELEPHONE WITH CARD-READER

BACKGROUND OF THE INVENTION

Field

This invention relates generally to telecommunications, and more specifically to an apparatus and a method for a telephone with a card-reader.

Related Art

With the convergence of voice and data networks and the integration of corresponding services, the usage of a telephone is no longer confined to voice communication. In one scenario, a consumer uses a telephone to pay for a purchase, transfer funds between bank accounts, or receive personal medical information from a doctor during a call.

In another scenario, a merchant uses a telephone to complete an electronic fund transfer, send an order fulfillment notice, or provide a shipping tracking number to a customer during a call.

In yet another scenario, a corporate employee uses a telephone in a collaboration session with colleagues, share a confidential document in real-time, or send a contract to a client.

The availability of these functionalities from a telephone, however, posts an unintended problem for its users.

In one example, Jane is a small business owner. She uses a telephone to receive and process contract bids. A salesman visits Jane to discuss business opportunities. When Jane goes to the bathroom, the salesman can see the confidential bidding information of her competing contractors at the telephone.

In one example, Tony is a human resource manager. He uses a telephone in his office to handle employee complaints of a recent harassment situation. A fellow employee comes to Tony's office while Tony is taking a lunch break and sees the highly sensitive information at the telephone.

Therefore, there is a need to provide a mean to activate communication services to intended users.

BRIEF SUMMARY OF THE INVENTION

A telephone with a card reader is disclosed. The telephone includes means for providing a first communication service. The card includes a memory, which stores information, where the telephone reads the information stored in the memory and provides a means for providing a second communication service based on the information. In providing the second communication service, the telephone obtains second communication service information from a datastore, which includes pairs of information and corresponding second communication service information. The telephone may include the datastore. The telephone may alternatively obtain the second communication service information from or a service server in response to a request. Alternatively, the information stored in the memory can be the second communication service information itself.

DETAILED DESCRIPTION OF THE INVENTION

Figure 1:
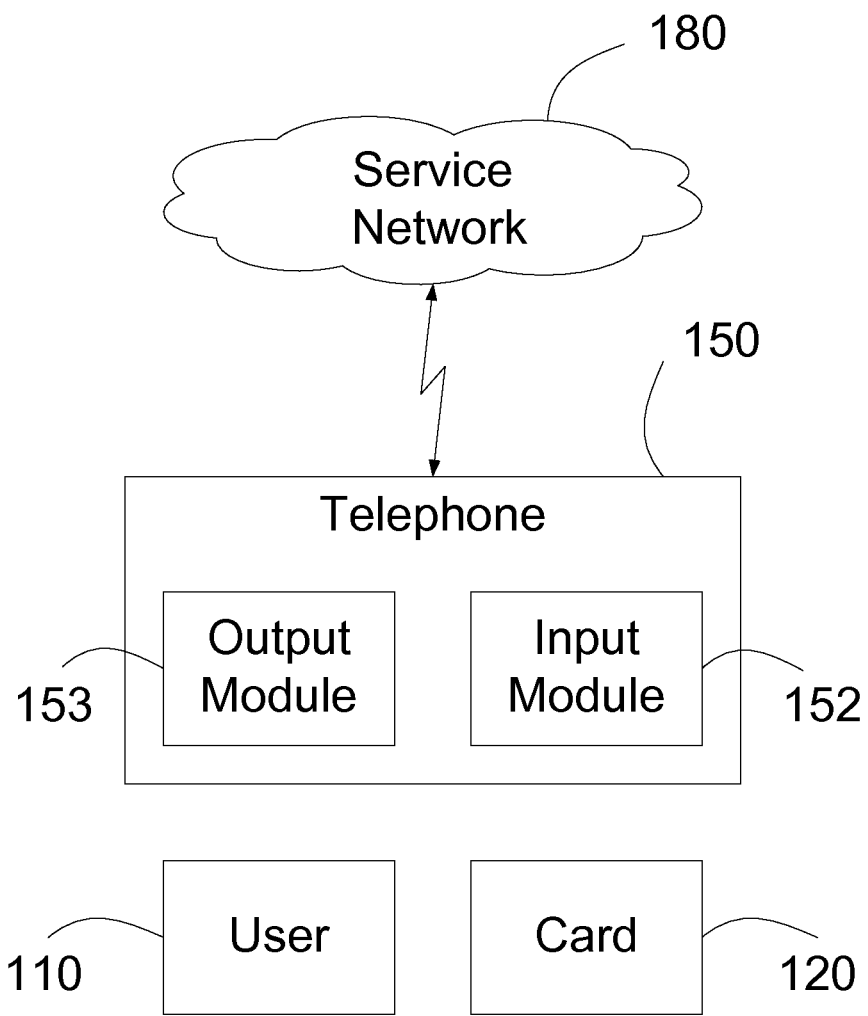
FIG. 1 illustrates a telephone.

FIG. 1 illustrates a telephone.
Telephone 150 provides a plurality of means to allow a user 110 to use a plurality of communication services over a service network 180.

In one embodiment, service network 180 includes a telephone network, such as Public Switched Telephone Network (PSTN), a corporate telephone network or a Voice over IP (VoIP) network. In one embodiment, service network 180 includes an Internet Protocol (IP) network. In one embodiment, service network 180 includes the Internet. In one embodiment, service network 180 includes a corporate Virtual Private Network (VPN). In one embodiment, service network 180 includes a wired network, such as an Ethernet. In one embodiment, service network 180 includes a wireless network, such as a General Packet Radio Service (GPRS) network, a Global System for Mobile Communications (GSM) network, or a WiFi network.

In one embodiment, a communication service includes an outgoing telephone service, a local telephone service or a long distance telephone service. In one embodiment, a communication service includes a voice message service. In one embodiment, a communication service includes a conferencing service. In one embodiment, a communication service includes an Instant Message (IM) based or a Voice over IP based voice service. In one embodiment, a communication service includes a group call service, or a hot-line telephone service. In one embodiment, a communication service is a directory service, or a yellow page service. In one embodiment, a communication service is a reminder service, such as an automatic walkup call service, a conference call reminder, or an appointment reminder service. In one embodiment, a communication service is an information service, such as a news headlines service, a local weather report service, a road condition service, a stock quote service, or an emergency alert service, such as a flood warning service or a child abduction alert service.

The plurality of communication services does not include certain services for government regulatory compliance, such as emergency (e.g. 911) calls, or functions that may exist locally, such as calendar, phone book, or games.

Telephone 150 includes an input module 152 and an output module 153. Input module 152 and output module 153 provide means to user 110 in order to use a communication service.

Telephone 150 sends outputs of a communication service via output module 153. In one embodiment, output module 153 includes a display screen, such as a graphical display screen or a character-based display screen. In one embodiment, output module 153 includes a speaker.

Telephone 150 processes inputs destined for a communication service via input module 152. In one embodiment, input module 152 includes a keyboard, a dialpad, a touchscreen or navigation buttons. In one embodiment, input module 152 includes a microphone. In one embodiment, input module 152 includes a mouse, a stylus, a pointing device, or a remote control device. In one embodiment, input module 152 includes a video camera.

Telephone 150 includes the functionality of reading a card 120. In one embodiment, card 120 is an employee card, a hotel guest card or a service subscription card. In one embodiment, card 120 includes a magnetic stripe. In one embodiment, card 120 includes a visually readable linear barcode, such as Universal Product Code (UPC) code; or a two-dimensional barcode, such as Portable Data File 417 (PDF417) matrix code. In one embodiment, card 120 includes physical characteristics, such as punch holes. In one embodiment, card 120 includes a memory, such as a flash memory. In one embodiment, card 120 includes a processor and associated memory. In one embodiment, card 120 includes a radio frequency (RF) module.

Figure 2:
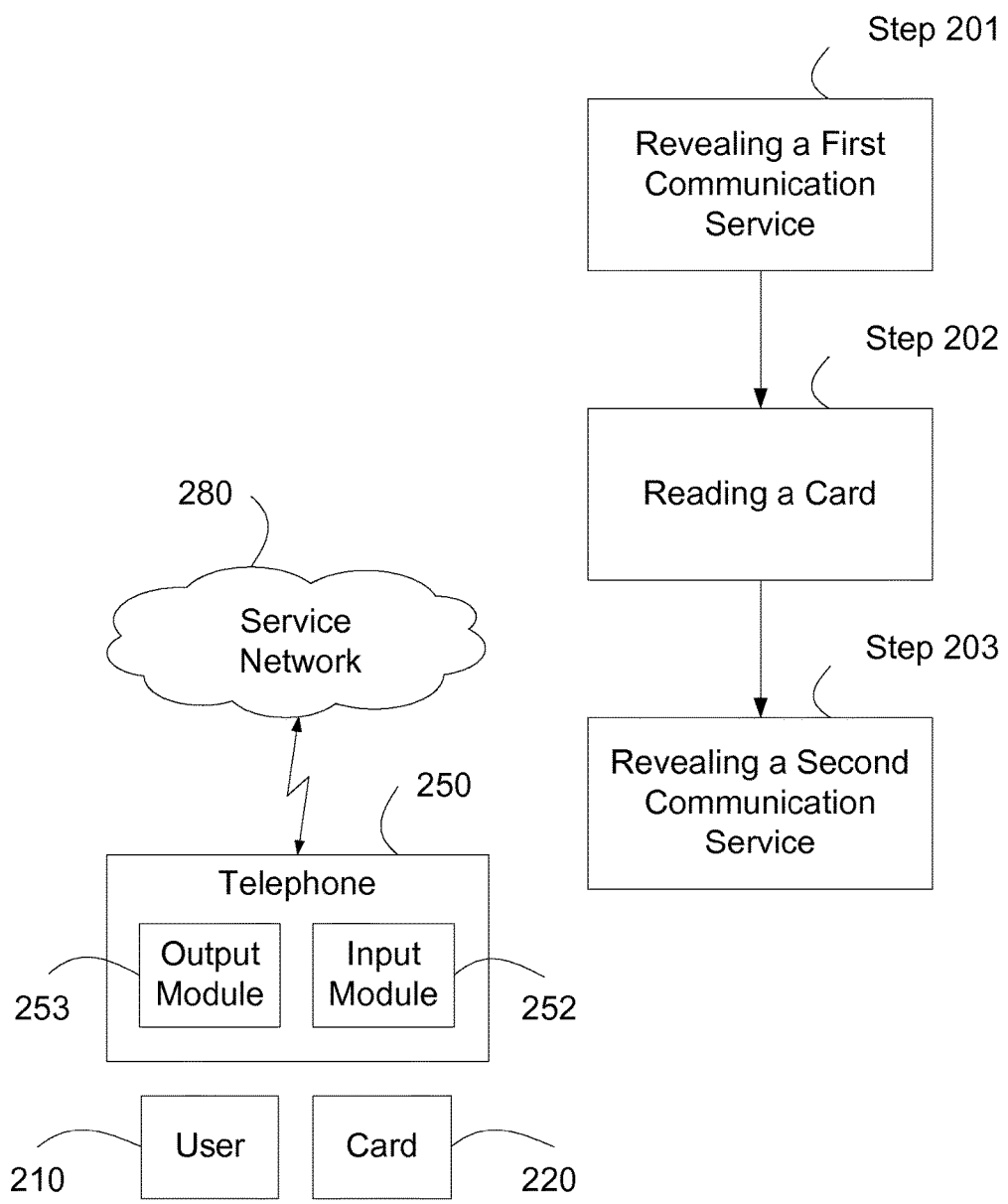
FIG. 2 illustrates a method for a telephone to process a card.

FIG. 2 illustrates a method for a telephone to process a card.

The method for telephone 250 to process card 220 includes step 201, step 202 and step 203.

In step 201, telephone 250 reveals a first communication service. Telephone 250 reveals the first communication service by providing means for user 210 to use the first communication service.

In one embodiment, the first communication service is an incoming telephone service. In one embodiment, telephone 250 connects to the incoming telephone service over service network 280. In one embodiment, telephone 250 enables a microphone in input module 252, and a speaker in output module 253 to allow user 210 to receive incoming calls.

In one embodiment, the first communication service is a local telephone service. In one embodiment, telephone 250 connects to the local telephone service over service network 280. In one embodiment, telephone 250 enables a dialpad and a microphone in input module 252, and a speaker in output module 253 to allow user 210 to make and receive local telephone calls. In one embodiment, telephone 250 accepts digit inputs from the dialpad that corresponds to local telephone numbers.

In step 202, telephone 250 reads card 220.

In one embodiment, telephone 250 includes a card holder. User 210 places card 220 in the card holder. Telephone 250 reads card 220 via the card holder.

In one embodiment, telephone 250 includes a card swipe slot. User 210 swipes card 220 through the card swipe slot. Telephone 250 reads card 220 via the card swipe slot.

In one embodiment, telephone 250 includes an optical mean, such as an infrared reader. User 210 places card 220 in an operational vicinity of the optical mean. Telephone 250 reads card 220 via the optical mean.

In one embodiment, telephone 250 includes a Radio Frequency (RF) module, such as a Bluetooth module. User 210 places card 220 within an operational distance from the RF module. Telephone 250 reads card 220 via the RF module.

After step 202, telephone 250 proceeds to step 203. In step 203, telephone 250 reveals a second communication service. Revealing the second communication service is different from revealing the first communication service.

In one embodiment, the second communication service is the same as the first communication service. In step 201, telephone 250 provides means for user 210 to use the first communication service. In step 203, telephone 250 provides additional means for user 210 to use the first communication service. For example, the communication service is a conferencing service. In step 201, telephone 250 reveals the communication service by enabling a speaker in output module 253 and a microphone in input module 252. In step 203, telephone 250 reveals the communication service by further enabling a display screen in output module 253 and a keyboard in input module 252.

In another embodiment, the second communication service is different from the first communication service. In one embodiment, the first communication service is a basic telephone service allowing user 210 to make a simple telephone call, and the second communication service is an Instant Message based voice service. In one embodiment, telephone 250 enables a display screen in output module 253 and a keyboard in input module 252 to allow user 210 to use the Instant Message based voice service. In another embodiment, the second communication service is a video conferencing service over a Virtual Private Network (VPN). Telephone 250 enables a video camera in input module 252.

As is known in the art, a conventional cellular telephone uses a Subscriber Identity Module (SIM) card. The identity stored in the SIM card can then be used to determine the services available to the user of the cellular telephone. However, in contrast to the telephone 250 of the present invention, before the SIM card is read by the conventional cellular telephone, no first communication service is revealed to the cellular telephone.

Figure 3:
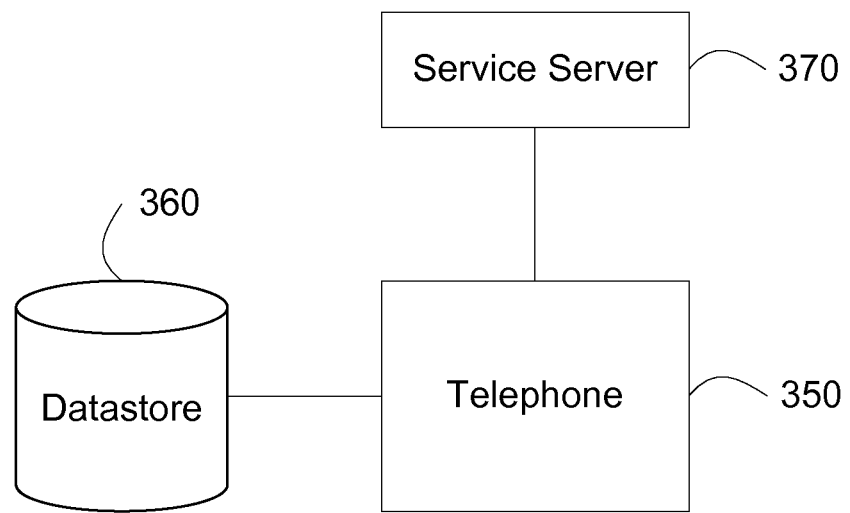
FIG. 3 illustrates a process of revealing a second communication service based on organizational information stored in a card.
Figure 3:
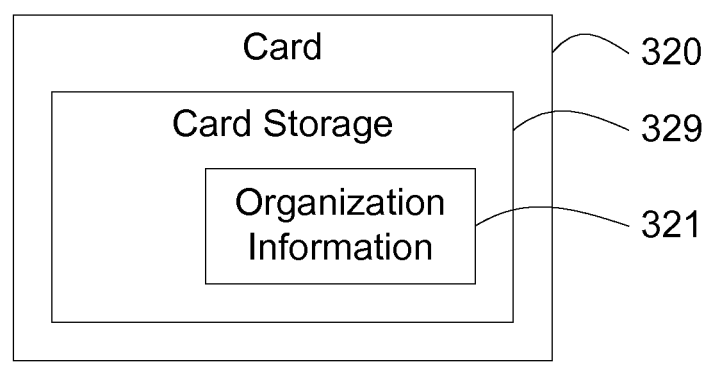

FIG. 3 illustrates a process of revealing a second communication service based on organizational information stored in a card.

Card 320 includes a card storage 329. In one embodiment, card storage 329 is a magnetic tape, a flash random access memory, a mini drive. In one embodiment, card storage 329 is a random access memory powered by an associated battery. In one embodiment, card storage 329 is a Non-Volatile Random Access Memory (NVRAM), such as a Magnetoresistive Random Access Memory (MRAM) or a carbon nanotubes memory. In one embodiment, card storage 329 is a plurality of punch holes.

Card 320 includes organization information 321 stored in card storage 329. Organization information 321 identifies an organization.

Telephone 350 reads card 320 by obtaining organization information 321 from card storage 329. Telephone 350 reveals a second communication service based on organization information 321.

In one embodiment, organization information 321 includes a company identity. Telephone 350 reveals a second communication service based on the company identity. In one embodiment, the company identity identifies a trading company. In one example, the second communication service is a Voice over IP conference service over a corporate virtual private network (VPN) of the trading company. In another example, the second communication service is a voice message service provided by a voice message system of the trading company.

In one embodiment, organization information 321 includes a department identity. Telephone 350 reveals a second communication service based on the department identity. In one embodiment, the department identity identifies an engineering department. In one example, the second communication service is an Instant Message based voice service for members of the engineering department. In another example, the second communication service is a directory service for members of the engineering department. The telephone directory service provides telephone directory of material suppliers, field trial customers and lab support personnel for the engineering department.

In one embodiment, telephone 350 connects to a datastore 360. In one embodiment, datastore 360 includes a hard disk, a memory, a flash memory or a database. In one embodiment, telephone 350 includes the datastore 360.

Datastore 360 includes organization information and communication service information. Telephone 350 determines a second communication service by matching organization information 321 with datastore 360. In one embodiment, datastore 360 includes a plurality of organization information and communication service information pairs. Telephone 350 matches organization information 321 with datastore 360. In one embodiment, telephone 350 finds a matched pair, and reveals the second communication service based on the communication service information in the matched pair.

In one embodiment, telephone 350 connects to a service server 370. Service server 370 includes the functionality of receiving a request and responding with a communication service information. Telephone 350 determines a second communication service in conjunction with service server 370.

In one embodiment, telephone 350 sends a request to service server 370. The request includes organization information 321. Telephone 350 receives a response from service server 370. Telephone 350 reveals the second communication service based on the communication service information of the response.

Figure 4:
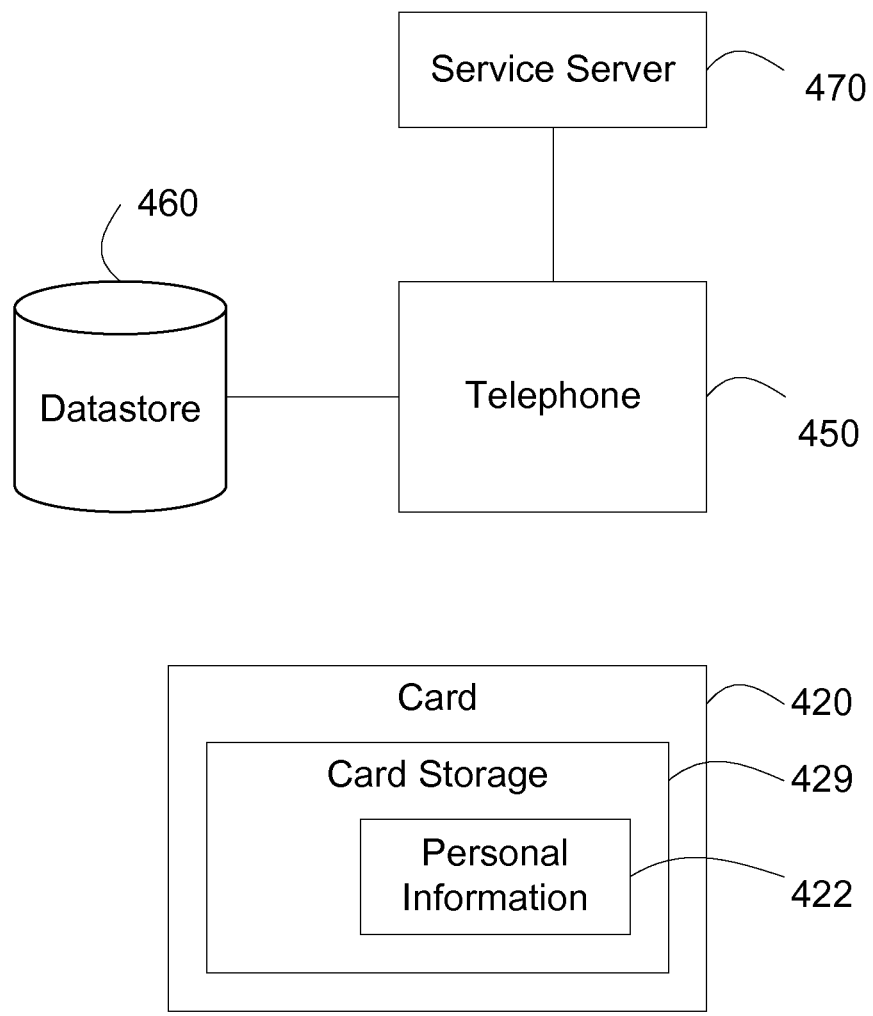
FIG. 4 illustrates a process to reveal a second communication service based on personal information stored in a card.

FIG. 4 illustrates a process to reveal a second communication service based on personal information stored in a card.

Card 420 includes a card storage 429. Card 420 includes personal information 422 stored in card storage 429. Personal information 422 identifies a person.

Telephone 450 reads card 420 by obtaining personal information 422 from card storage 429. Telephone 450 reveals a second communication service based on personal information 422.

In one embodiment, personal information 422 includes an employee number. Telephone 450 reveals a second communication service based on the employee number. In one example, the second communication service is a personal schedule reminder service for the employee, such as an alert service of scheduled conference calls for the employee. In another example, the second communication service is a remote call forward service that forwards phone calls destined for the employee to telephone 450.

In one embodiment, information 422 includes a hospital patient identity. Telephone 450 reveals a second communication service based on the hospital patient identity. In one example, the second communication service is a direct call service to a surgeon who has operated on the patient. In another example, the second communication service is a personal directory service that provides telephone directory information of friends and family of the patient.

In one embodiment, telephone 450 connects to a datastore 460. In one embodiment, telephone 450 includes the datastore 460. Datastore 460 includes personal information and communication service information. Telephone 450 determines a second communication service by matching personal information 422 with datastore 460. In one embodiment, datastore 460 includes a plurality of personal information and communication service information pairs. Telephone 450 matched personal information 422 with the plurality of personal information and communication service information pairs in datastore 460. In one embodiment, telephone 450 finds a matched pair, and reveals the second communication service based on the communication service information in the matched pair.

In one embodiment, telephone 450 connects to a service server 470. Service server 470 includes the functionality of receiving a request and responding with a communication service information. Telephone 450 determines a second communication service in conjunction with service server 470. Telephone 450 sends a request to service server 470. The request includes personal information 422. Telephone 450 receives a response from service server 470. Telephone 450 reveals the second communication service based on the communication service information in the response.

Figure 5:
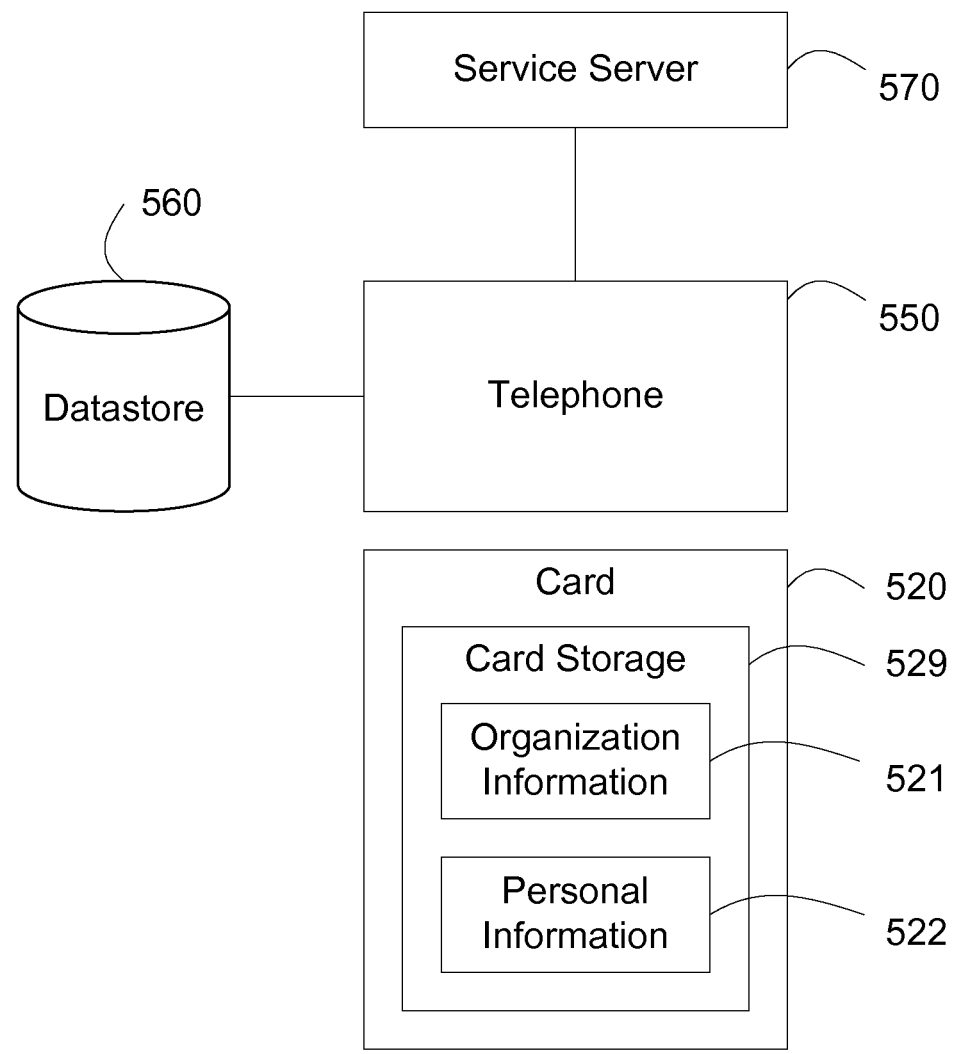
FIG. 5 illustrates a process to reveal a second communication service based on a combined organization information and personal information stored in a card.

FIG. 5 illustrates a process to reveal a second communication service based on a combined organization information and personal information stored in a card.

Card 520 includes card storage 529. Card 520 includes organization information 521 and personal information 522 stored in card storage 529.

Telephone 550 reads card 520 by obtaining organization information 521 and personal information 522 from card storage 529. Telephone 550 reveals a second communication service based on the combined organization information 521 and personal information 522.

In one embodiment, organization information 521 includes a company identity and personal information 522 includes an employee number. The company identity identifies a company and the employee number identifies an employee. Telephone 550 reveals a second communication service based the company identity and the employee number. In one embodiment, the second communication service is a personalized directory service provided by the company, and the personalized directory service provides telephone numbers for friends and family, or frequently dialed business telephone numbers for the employee. In one embodiment, the second communication service is a video conferencing service provided by the company, and the video conferencing service provides personalized conferencing functionalities for the employee. In one embodiment, the video conference service sends alert signals according to the employee's personal conference schedule. In another embodiment, the video conferencing service tailors conference experience, such as audio and video parameters according to personal preference of the employee.

In one embodiment, telephone 550 connects to a datastore 560. In one embodiment, telephone 550 includes the datastore 560. Datastore 560 stores organization information, personal information, and communication service information. Telephone 550 determines a second communication service by matching organization information 521 and personal information 522 with datastore 560. In one embodiment, datastore 560 includes a plurality of organization information, personal information and communication service information triplets. Telephone 550 matched organization information 521 and personal information 522 with the plurality of organization information, personal information and communication service information triplets in datastore 560. In one embodiment, telephone 550 finds a matched triplet, and reveals the second communication service based on the communication service information in the matched triplet.

In one embodiment, telephone 550 connects to a service server 570. Service server 570 includes the functionality of receiving a request and responding with a communication service information. Telephone 550 determines a second communication service in conjunction with service server 570.

In one embodiment, telephone 550 sends a request to service server 570. The request includes organization information 521 and personal information 522. Telephone 550 receives a response from service server 570. Telephone 550 reveals the second communication service based on the communication service information in the response.

In one embodiment, telephone 550 reveals a second communication service after authenticating organization information 521. In one embodiment, telephone 550 reveals a second communication service after authenticating personal information 522. In one embodiment, telephone 550 reveals a second communication service after authentication the combined organization information 521 and personal information 522. In one embodiment, telephone 550 conducts the authentication with service server 570. In another embodiment, telephone 550 conducts the authentication with a different server.

Figure 6:
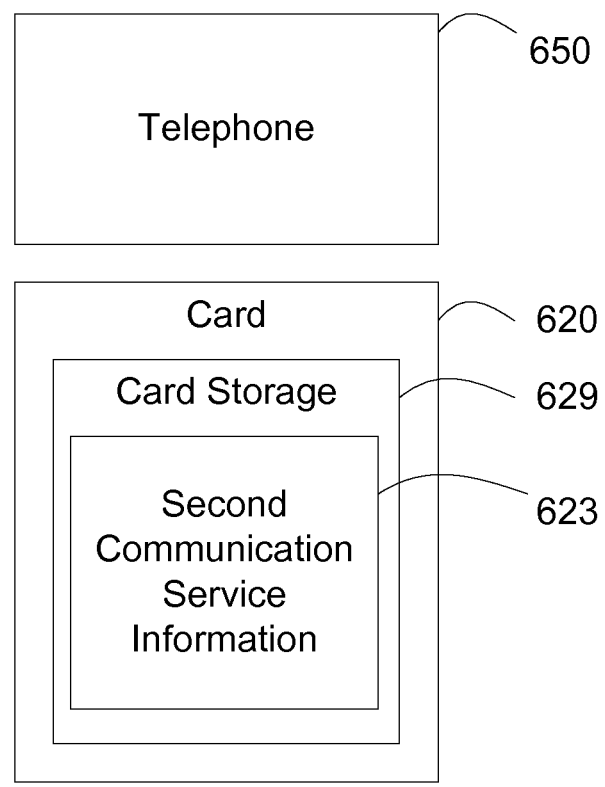
FIG. 6 illustrates a process to reveal a second communication service based on second communication service information stored in a card.

FIG. 6 illustrates a process to reveal a second communication service based on second communication service information stored in a card.

Card 620 includes a card storage 629. Card 620 includes second communication service information 623 stored in card storage 629.

Telephone 650 reads card 620 by obtaining second communication service information 623 from card storage 629. Telephone 650 reveals the second communication service based on the second communication service information 623.

The telephone can be used to reveal residential phone services, business phone services, industrial phone services such as hospital phone services and hotel/motel services, or campus phone services such as college dormitory phone services. In one embodiment, residential phone services include services for working parents, house wives, or students, such as consumer commercial services, local traffic and weather reports, school activities notification, or community group call communication services. In one embodiment, business phone services include business transaction services, such as electronic fund transfer, supply ordering, contract bidding or shipment confirmation. In one embodiment, hospital phone services include medical information services, treatment or medication administration services for hospital professionals or personal directory services for patients. In one embodiment, hotel/motel services include facility, show or restaurant reservation services, group call service for traveling companions, business conference scheduling and information services, or Voice over IP service over corporate VPN access. In one embodiment, campus phone services include study group communication services, dormitory activity notification services, or course registration services.

What is claimed is:

1. A mobile telephone activated for a cellular telephone service, the mobile telephone configured with a first set of components enabled for the cellular telephone service, the mobile telephone further configured to:
connect to the cellular telephone service over a service network, wherein the cellular telephone service comprises receiving a first cellular telephone call over the service network using the first set of components;
after connecting to the cellular telephone service, read a card to obtain a user identity stored on the card for the user of the mobile telephone for a purpose of activating an Internet Protocol (IP) based voice service;
send a request over the service network to activate the IP based voice service using the user identity, wherein the user identity matches one or more user identity/telephone service information pairs, wherein telephone service information of the one or more user identity/telephone service information pairs is used to activate the IP based voice service;
receive a response to the request, the response comprising communication service information; and
using the communication service information, enable a second set of components of the mobile telephone for the IP based voice service in addition to the enabled first set of components, wherein the IP based voice service allows the user to receive a second IP voice call over a wireless network using the second set of components, wherein the second IP voice call is a different call than the first cellular telephone call.

2. The mobile telephone of claim 1, further configured to: connect to a datastore, the datastore comprising a plurality of user identity/telephone service information pairs, wherein the mobile telephone matches the one or more user identity/telephone service information pairs of the plurality of user identity/telephone service information pairs to the user identity read from the card.

3. The mobile telephone of claim 1, wherein the card comprises a subscriber identification module (SIM) card.

4. The mobile telephone of claim 1, wherein the reading of the card comprises reading a visually readable barcode.

5. The mobile telephone of claim 1, wherein the wireless network comprises a WiFi network or an IP over cellular network.

6. The mobile telephone of claim 1, wherein the IP based voice service comprises one or more of the following: news; weather report; road condition report; stock report; and emergency alert.

7. The mobile telephone of claim 1, wherein the IP based voice service comprises a conferencing service, wherein the second set of components comprises a camera enabled for the conferencing service.

8. The mobile telephone of claim 1, wherein the IP based voice service comprises a corporate voice service or a voice message service.

9. The mobile telephone of claim 8, wherein the user identity stored on the card comprises employee information or guest information.

10. A mobile telephone configured with a first set of components enabled for an Internet Protocol (IP) based voice service, the mobile telephone further configured to:
connect to the IP based voice service over a service network comprising a WiFi data network, wherein the IP based voice service comprise receiving a first IP voice call over the WiFi data network using the first set of components;
after connecting to the IP based voice service, read a card to obtain a user identity stored on the card for a user of the mobile telephone for a purpose of activating an IP based cellular telephone service associated with a telephone number of the mobile telephone;
send a request over the service network to activate the IP based cellular telephone service using the user identity, wherein the user identity matches one or more user identity/telephone service information pairs, wherein telephone service information of the one or more user identity/telephone service information pairs is used to activate the IP based cellular telephone service;
receive a response to the request, the response comprising communication service information; and
using the communication service information, enable a second set of components of the mobile telephone for the IP based cellular telephone service in addition to the first set of components, wherein the IP based cellular telephone service allows the user to receive a second IP voice call over a cellular data network using the second set of components, wherein the second IP voice call is a different call than the first IP voice call.

11. The mobile telephone of claim 10, further configured to:
connect to a datastore, the datastore comprising a plurality of user identity/telephone service information pairs, wherein the mobile telephone matches the one or more user identity/telephone service information pairs of the plurality of user identity/telephone service information pairs to the user identity read from the card.

12. The mobile telephone of claim 10, further comprising an optical means for reading the card.

13. The mobile telephone of claim 10, wherein the second set of components comprises a touchscreen or a camera.

14. A method for enabling an Internet Protocol (IP) based voice service on a mobile telephone, the mobile telephone configured with a first set of components enabled for a cellular telephone service, the method comprising:
(a) connecting to the cellular telephone service over a service network, wherein the cellular telephone service comprises receiving a first cellular telephone call using the first set of components
(b) after connecting to the cellular telephone service, reading a card to obtain a user identity stored on the card for the user of the mobile telephone for a purpose of activating the IP based voice service;
(c) sending a request over the service network to activate the IP based voice service using the user identity, wherein the user identity matches one or more user identity/telephone service information pairs, wherein telephone service information of the one or more user identity/telephone service information pairs is used to activate the IP based voice service;
(d) receiving a response to the request, the response comprising communication service information; and
(e) using the communication service information, enabling a second set of components of the mobile telephone for the IP based voice service in addition to the enabled first set of components, wherein the IP based voice service allows the user to receive a second IP voice call over a wireless network using the second set of components, wherein the second IP voice call is a different call than the first cellular telephone call.

15. The method of claim 14, wherein the reading (b) further comprises:
(b1) connecting to a datastore by the mobile telephone, the datastore comprising a plurality of user identity/telephone service information pairs; and
(b2) matching, by the mobile telephone, the one or more user identity/telephone service information pairs of the plurality of user identity/telephone service information pairs to the user identity read from the card.

16. The method of claim 14, wherein the card comprises a subscriber identification module (SIM) card.

17. The method of claim 14, wherein the reading (b) comprises:
(b1) reading a visually readable barcode to obtain the user identity.

18. The method of claim 14, wherein the wireless network comprises a WiFi network or an IP over cellular network.

19. The method of claim 14, wherein the IP based voice service comprises one or more of the following: news; weather report; road condition report; stock report; and emergency alert.

20. The method of claim 14, wherein the IP based voice service comprises a conferencing service, wherein the second set of components comprises a camera enabled for the conferencing service.

21. The method of claim 14, wherein the IP based voice service comprises a corporate voice service or a voice message service.

22. The method of claim 21, wherein the user identity stored on the card comprises employee information or guest information.

23. A method for enabling an Internet Protocol (IP) based cellular telephone service on a mobile telephone, the mobile telephone configured with a first set of components enabled for an IP based voice service, the method comprising:
(a) connecting to the IP based voice service over a service network comprising a WiFi data network, wherein the IP based voice service comprises receiving a first IP voice call over the WiFi data network using the first set of components;
(b) after connecting to the IP based voice service, reading a card to obtain a user identity stored on the card for a user of the mobile telephone for a purpose of activating the IP based cellular telephone service associated with a telephone number of the mobile telephone;
(c) sending a request over the service network to activate the IP based cellular telephone service using the user identity, wherein the user identity matches one or more user identity/telephone service information pairs, wherein telephone service information of the one or more user identity/telephone service information pairs is used to activate the IP based cellular telephone service;
(d) receiving a response to the request, the response comprising communication service information; and
(e) using the communication service information, enabling a second set of components of the mobile telephone for the IP based cellular telephone service in addition to the enabled first set of components, wherein the IP based cellular telephone service allows the user to receive a second IP voice call over a cellular data network using the second set of components, wherein the second IP voice call is a different call than the first IP voice call.

24. The method of claim 23, wherein the reading (b) further comprises:
(b1) connecting to a datastore by the mobile telephone, the datastore comprising a plurality of user identity/telephone service information pairs; and
(b2) matching, by the mobile telephone, the one or more user identity/telephone service information pairs of the plurality of user identity/telephone service information pairs to the user identity read from the card.

* * * * *